Nov. 17, 1942.                M. L. RHINE                2,302,254
                              ROTARY MOTOR
                           Filed April 17, 1939           3 Sheets-Sheet 1
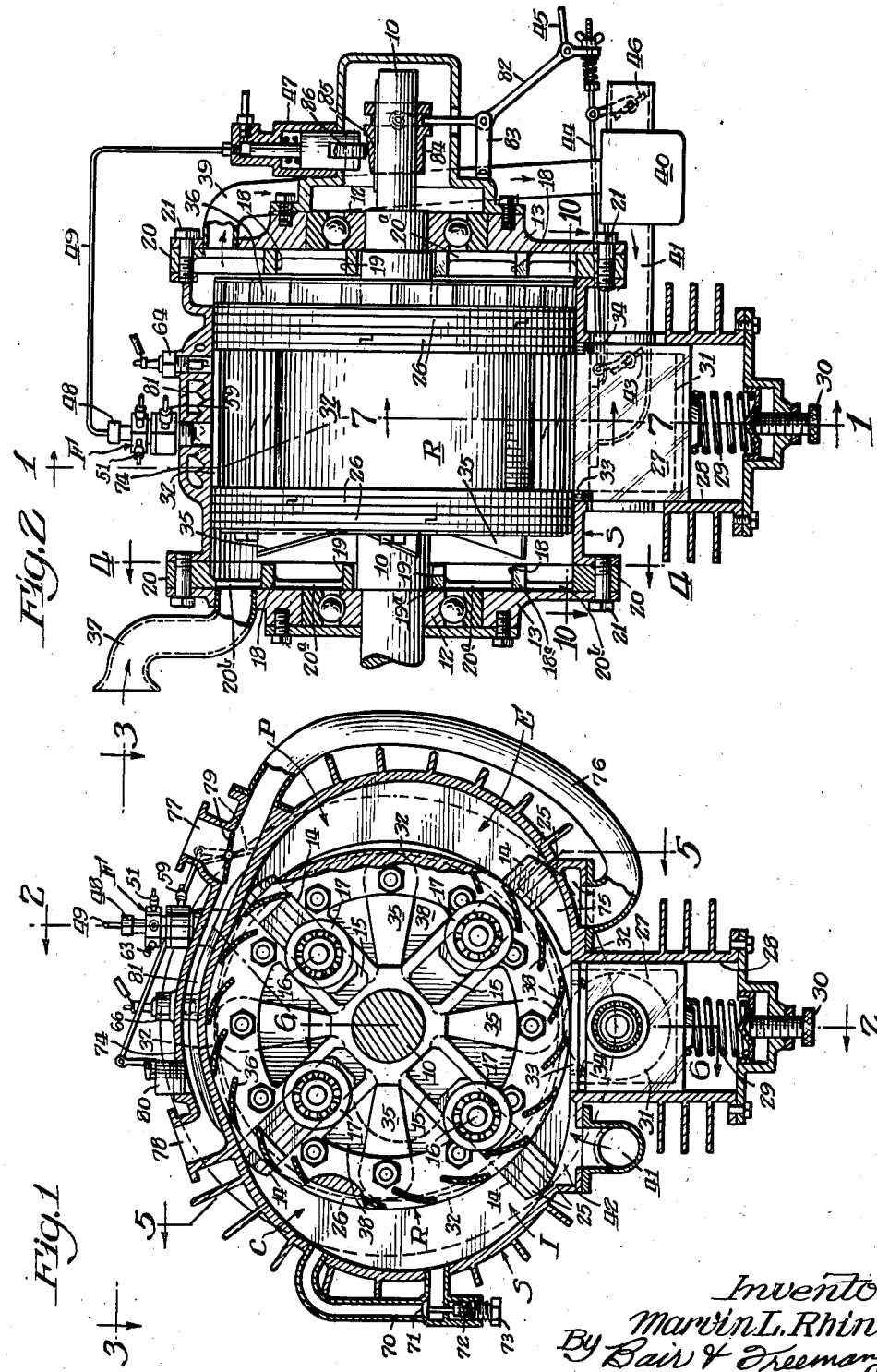
Inventor
Marvin L. Rhine
By Bair & Freeman
Atty.

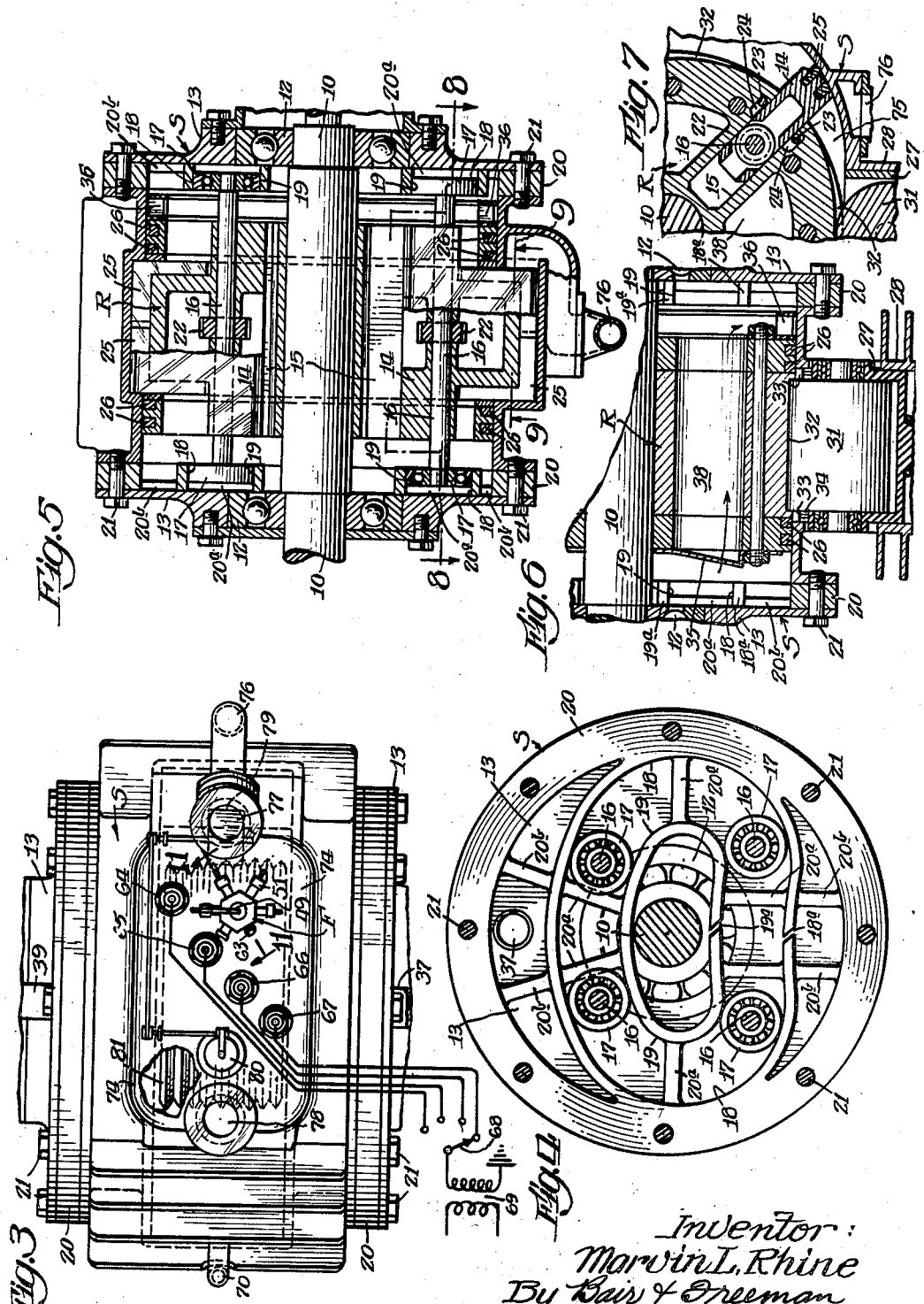

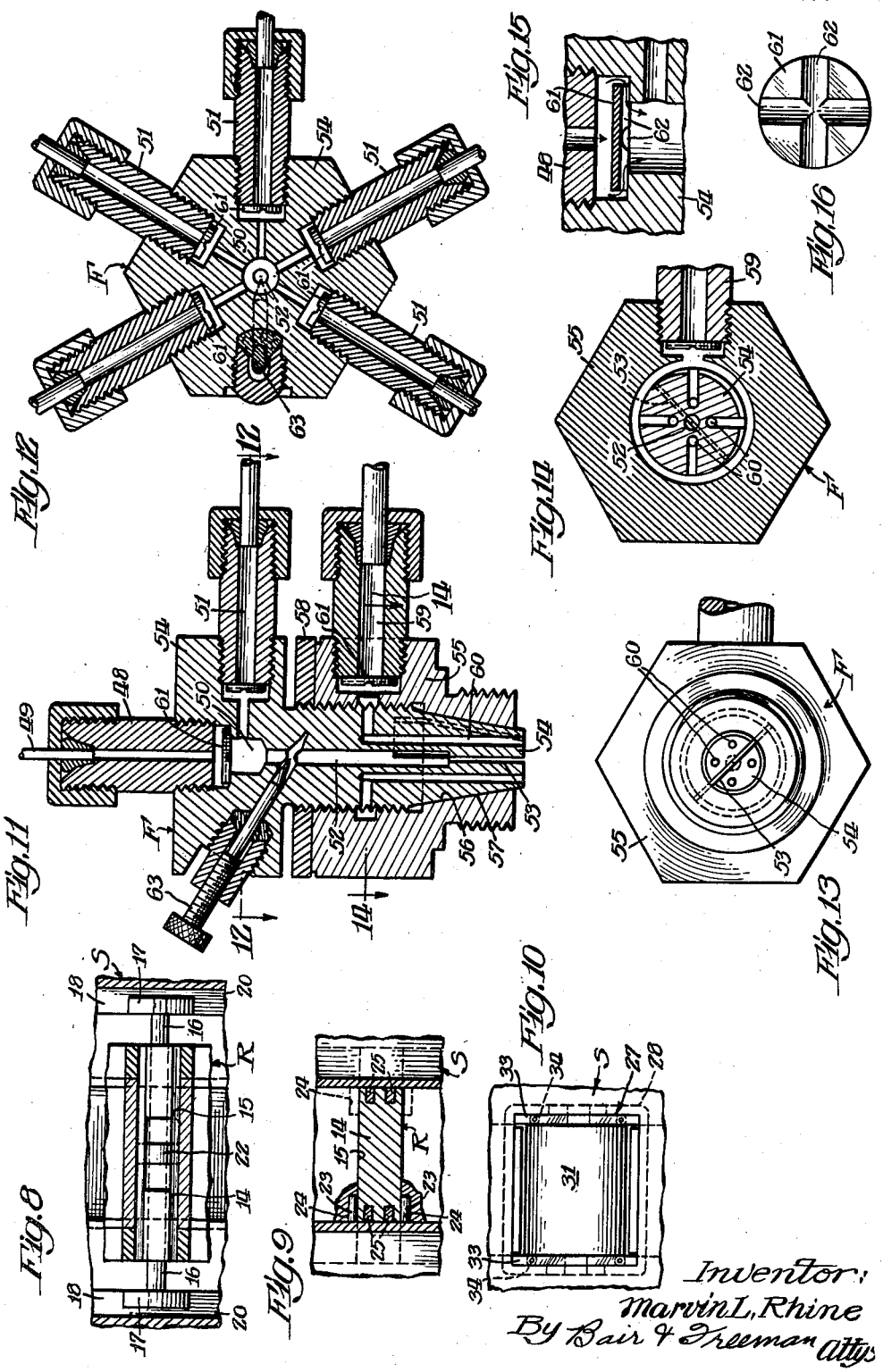

Patented Nov. 17, 1942

2,302,254

UNITED STATES PATENT OFFICE 2,302,254

ROTARY MOTOR

Marvin L. Rhine, Hibbing, Minn.

Application April 17, 1939, Serial No. 268,327

5 Claims. (Cl. 123—16)

An object of my invention is to provide a rotary motor of simple durable and inexpensive construction.

A further object is to provide a motor including a stator and a rotor, the rotor having blades slidable relative thereto and the stator being of elliptical contour to provide intake, compression, power and exhaust sections in the stator, which cooperate with the blades to provide intake, compression, power and exhaust strokes with positive displacement of gases by the blades and complete expulsion of exhaust gases from the exhaust section as well as complete intake, compression and power operations of the motor with very high efficiency of operation.

Another object is to provide a rotary motor in which three or more blades are provided in the rotor and means are provided to minimize the friction of the blades in the rotor as the blades slide in slots of the rotor, such means consisting of rollers coacting between the blades and the slots, some of the rollers being floatingly mounted in rollerways provided in the rotor.

Another object is to provide a rotary motor in which timing means for the spark may be eliminated by the use of several spark plugs arranged at different advanced and retarded positions and a selective means for energizing them with high tension current, it being possible to continuously energize any desired spark plug as the blades of the rotor serve to cut off the spark plug from the compressed gas until the desired position in the cycle of rotation of the rotor is reached.

Another object is to provide a rotary motor in which a carburetor can be used to supply fuel thereto, means being provided to cool the rotor and at the same time preheat supercharging air for the carburetor.

Still another object is to provide a fuel plug cooperating with the motor in such manner that atomized fuel for Diesel or semi-Diesel operation is possible instead of using the carburetor, the plug being constructed to permit lubrication therethrough or the introduction of air, oxygen, or other chemicals in gas or liquid form to the motor.

Still a further object is to provide a means for increasing the efficiency of the motor by jacketing a portion of the stator adjacent the compression and power sections thereof and passing exhaust gas through the jacket, thermostatic means being provided to control the amount of such gas.

Still a further object is to provide a rotary motor in which the compression ratio can be readily varied as desired, the means for this purpose being in the form of a by-pass between the intake and compression sections of the stator and having a loaded check valve therein and means to vary the loading thereon.

Still another object is to provide a rotary motor which eliminates the necessity of using poppets or other types of valves for introducing fuel mixtures to the motor or permitting the expulsion of exhaust gases therefrom. The rotor of the motor for this purpose having slidable plates that pass intake and exhaust ports and so coact with them so as to properly time the intake of fresh fuel and the exit of exhaust gases. A motor of this character eliminates the necessary valve gear of the usual internal combustion engine and the attendant troubles experienced therewith as well as reducing the required servicing of the motor after it has been in service for a period of time.

With these and other objects in view, my invention consists in the construction, arrangement and combination of the various parts of my rotary motor, whereby the objects contemplated are attained, as hereinafter more fully set forth, pointed out in my claims, and illustrated in the accompanying drawings, in which:

Figure 1 is a vertical sectional view through a rotary motor embodying my invention as taken on the line 1—1 of Figure 2 with the rotor shown in elevation, and with parts broken away to show rotor and blower structure.

Figure 2 is a vertical section therethrough as taken on the line 2—2 of Figure 1, the carburetor and its conduits being shown in elevation.

Figure 3 is a plan view of the motor showing diagrammatically the connection of a source of high tension current for the spark plugs thereof.

Figure 4 is a sectional view on the line 4—4 of Figure 2 showing cam rollers and cams operable to actuate the blades of my motor and cause them to follow the contour of the inner wall of the stator.

Figure 5 is a sectional view on the line 5—5 of Figure 1 to show the construction of the rotor blades and the coaction of the cam rollers carried thereby with the cams of the end plates of the stator.

Figure 6 is a sectional view on the line 6—6 of Figure 1 showing a cut-off blade at the bottom of the motor.

Figure 7 is a sectional view on the line 7—7 of Figure 2 to illustrate constructional details of the rotor and blade.

Figures 8 and 9 are sectional views on the lines

8—8 and 9—9 of Figure 5 to further illustrate the construction thereof.

Figure 10 is a plan view of the cut-off blade as at the indicated arrows 10—10 of Figure 2.

Figure 11 is an enlarged sectional view on the line 11—11 of Figure 3 illustrating a fuel plug of my rotary motor.

Figure 12 is a sectional view thereof on the line 12—12 of Figure 11.

Figure 13 is a bottom plan view of the fuel plug.

Figure 14 is a sectional view on the line 14—14 of Figure 11.

Figure 15 is an enlarged sectional view of a portion of Figure 11 showing the action of a check valve of the fuel plug; and Figure 16 is a bottom plan view of the check valve of Figure 15.

On the accompanying drawings I have used the reference character S to indicate generally a stator and R a rotor. The stator S is a hollow casing having an inner wall of elliptical contour defining intake, compression, power and exhaust sections I, C, P and E respectively.

The rotor R is mounted on a shaft 10 journaled in bearings 12. The bearings 12 are supported in end plates 13 of the stator S. Blades 14 are slidably mounted in slots 15 of the rotor R and adapted to contact at their outer ends with the generally elliptical inner wall of the stator S.

To insure such contact the blades 14 are provided with shafts 16 having rollers 17 mounted on the outer ends thereof. The rollers 17 coact with internal cam surfaces 18 and external cam surfaces 19 of cam plates 20. The cam plates 20 are interposed between the end plates 13 and the ends of the stator casing S, the parts S, 13 and 20 being secured together by bolts 21.

The cam plates 20 are of cut away construction with the cam tracks 18 and 19 suitably supported by webs 20a and 20b. The tracks 18 and 19 are split at 18a and 19a to permit the cam plates 20 to expand and contract with the stator as there are variations in the temperature of the motor. This arrangement prevents any binding of the parts and by locating the splits 18a and 19a at the particular points indicated, there is no pressure on the rollers 17 to force the blades 14 either inwardly or outwardly thus making it possible to provide the splits 18a and 19a without a gap in the tracks 18 and 19 being detrimental to the operation.

To minimize friction of the blades 14 in the slots 15 of the rotor, I provide rollers 22 to roll in the slots and loose rollers 23 to roll in rollerways 24 of the rotor (see Figures 7 and 8).

L-shaped packing bars 25 are mounted in packing bar grooves of the outer ends of the blades 14 to prevent leakage around the ends and sides of the blades. To prevent leakage across the ends of the rotor I provide annular packing rings 26 (see Figures 2 and 5), a cut-off blade or packing is provided between the exhaust and intake sections E and I of the stator S and consists of a box-like blade 27 slidable in a bore 28 extending downwardly in the bottom of the stator casing S. The cut-off blade 27 is biased against the rotor R by a spring 29, the tension of which may be adjusted by a screw 30. A cut-off roller 31 is journaled in the blade 27 and is adapted to enter pockets 32 of the rotor R. The pockets 32 are provided between the blades 14 as shown in the sectioned part at the right side of the rotor in Figure 1 and adapted to by-pass compressed gas from the compression section C to the power section P when spanning these two sections as does the upper pocket 32 shown by dotted lines in Figure 1. This permits the compressed gas to pass over from the compression chamber to the power chamber where it is then ignited for explosion to produce the power stroke. As the pockets 32 pass the roller 31, it enters them and wipes them out so as to expel all exhaust gas from the pockets. Packing bars 33 (see Figure 6) are provided on the cut-off blade 27 and urged by springs 34 to engage the rotor R between the sides of the pockets 32 and the adjacent packing rings 26 during the time that the roller 31 is wiping out the pockets 32.

For keeping the rotor R and the stator S cool, the rotor is made hollow and is provided on one end (which I shall call the intake end) with fan blades 35. On its other end it is provided with blower blades 36. The fan blades 35 draw cooling air in through an intake 37 and force it through openings 38 through the rotor. The blower blades 36 then pick up the air and force it through a conduit 39 to a carburetor 40 (omitted from Figure 1). The air thus cools off the rotor and becomes preheated and being under pressure from the blower 36 acts as a supercharger for the carburetor 40.

The air and atomized gas from the carburetor 40 flows through an intake pipe 41 to an intake port 42 in the intake section of the stator S. A throttle 43 is provided for the fuel from the carburetor and is connected by a rod 44 to a control rod 45. A choke valve 46 is also connected to the rod 44.

Instead of the carburetor 40 or in addition to it I may actuate my motor on the Diesel or semi-Diesel principle. For this purpose I provide a fuel plug F and a pump 47 for pumping fuel thereto and spraying it from the plug into the power section P of the stator S. The fuel plug F has a plurality of intakes, one of which is indicated at 48 and is connected by a pipe 49 with the pump 47. The fuel forced through the intake 48 enters a mixing chamber 50 and communicating with this chamber are other intakes 51. The intakes 51 may be provided for lubricating oil, grease or compound for lubricating purposes or the intakes may be provided for chemicals in gas or liquid form for fuel purposes.

Communicating with the mixing chamber 50 is a passageway 52 terminating in a slot 53. The intakes 48 and 51 are mounted in an inner member 54 of the fuel plug F and the passageway 52 and slot 53 are provided in this member. The member 54 is threaded in a second member 55 of the fuel plug and the two members are provided with coacting tapered faces 56 and 57. As the parts are screwed further together, the slot 53 is closed thus adjusting the spray from the lower end of the member 54 which member acts as a nozzle. A lock nut 58 is provided for retaining the adjustment of the member 54 in any desired position.

In addition to the intakes 48 and 51 I have provided an intake 59 for air, oxygen or the like. The intake 59 communicates with passageways 60 terminating at the lower end of the nozzle member 54. Air under pressure may be introduced at the intake 59 for raising the compression of the motor or oxygen or other gas from pressure tanks or pumps may be introduced to the intake 59.

In conjunction with each of the intakes 48, 51 and 59, I provide check valves 61 of disc-like character. The discs are provided with radial grooves 62 to permit flow of fuel or the like past the valve as shown by the arrows in Figure 15 in one direction, but when the pressure of explosion in the motor comes against the discs 61 they are forced to seated position as against the intakes 51 and 59 of Figure 11. This prevents back pressure in the intakes 48, 51 and 59.

Between the mixing chamber 50 and the passageway 52, I provide a shut off valve 63. It is preferably of the needle type and may be closed whenever it is desirable to shut off fuel from the mixing chamber and use the carburetor 40 or the intake 59.

For firing the combustible fuel in my rotary motor I provide a plurality of spark plugs 64, 65, 66 and 67. The plugs 64 and 65 are omitted from Figure 1. These may be selectively connected as by a switch 68 with a source of high tension current. By way of illustration I show a transformer or spark coil 69, although, of course, a high tension magneto driven by the rotor R may be used instead. The spark plugs may be energized continuously thus eliminating the necessity of a timer and by selectively energizing them the plug 64 may be used for starting purposes while the plugs 65, 66 and 67 (when the switch 68 is adjusted for any one of them) serve as a means to "advance the spark." Referring to Figure 1, the upper two blades 14, it will be noted, have the compressed gas confined between them and as soon as the upper right hand plug uncovers the spark plug 64, it will act on the compressed gas to ignite it and the gas will commence to expand after slight further rotation clockwise of the rotor in Figure 1 in as much as it takes some little time after the spark contacts with the gas for expansion to occur. The power stroke, however, will start at the proper time depending upon the speed at which the motor is operating and the switch 68, of course, is adjusted to the proper spark plug to suit the speed.

In a motor of the kind herein disclosed, it is possible to adjust the compression ratio in a very simple manner. For this purpose I provide a by-pass 70 between the compression section or chamber C of the stator S and the intake chamber I thereof. A loaded check valve 71 is provided in the by-pass passageway, the loading being effected by a spring 72. The spring is adjustable as by a nut 73 so that the check valve 71 will not be opened until a predetermined pressure has been built up in the passageway 70. Thus by increasing the strength of the spring there will be higher pressure up to the capacity of the chamber C and any excess beyond this pressure is by-passed to the intake chamber I thus holding the compression down to any pressure desired below maximum.

To increase the efficiency of my motor I provide a jacket 74 on the stator S over the adjacent ends of the compression and power chambers C and P. Exhaust ports 75 are provided for the escape of exhaust gases from the exhaust chamber E, which ports communicate with an exhaust pipe 76. The pipe 76 communicates with the jacket 74 and with a pair of outlets 77 and 78 at opposite ends of the jacket. A valve 79 is mounted in the outlet 77 and the position thereof is controlled by a thermostat 80. When the motor is cold the exhaust gas all passes through the jacket 74. Within the jacket fins 81 are provided on the stator S to increase the heat transfer possibilities of the stator. As the thermostat 80 is heated, the valve 79 shifts towards the dotted position of Figure 1 to cut down the exhaust gas passing through the passageway 74 and permit some of it to escape through the outlet 77. Thus I raise the temperature of the space in the jacket 74 until after the motor is started.

A rotary motor of the character herein disclosed can be inexpensively manufactured as due to its design there is large displacement in the chambers I, C, P and E of the stator relative to the size of the motor. Therefore I am able to provide a motor that has a relatively high horse power compared to its weight and one which is accordingly adaptable for airplane use. By using the Diesel or semi-Diesel principle, the motor can be operated very economically.

As a matter of control for the speed of the motor, the control rod 45 is connected with a lever 82 pivoted to a bracket 83 (see Figure 2). After the throttle 46 is controlled by the rod 45, a cam 84 is shifted on the shaft 10. The cam 84 has a tapered lobe 85 cooperating with a roller 86 of the pump 47. Thereby after the throttle 43 is opened, the stroke of the pump 47 is increased. If fuel is supplied to the carburetor 40 and to the pump 47 at the same time, the motor operates on fuel from both sources while fuel can be shut off to the carburetor and the motor then run on the Diesel principle only if desired. On the other hand if fuel is shut off to the pump 47, then the motor may operate entirely on the carburetor.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a rotary motor, a stator, a rotor therein, blades slidably carried by said rotor and engaging the inner wall of said stator, said inner wall being of elliptical contour to provide intake, compression, power and exhaust strokes for said blades, a carburetor communicating with the intake section of said stator, said rotor being hollow, means for propelling air therethrough to cool the rotor, said carburetor receiving air from said last means, a fuel plug communicating with the power section of said stator, a pump operated by said rotor and connected with said fuel plug to supply fuel under pressure thereto, and means for simultaneously adjusting the capacity of said fuel pump and the flow of fuel from said carburetor.

2. In a rotary motor, a stator, a rotor therein, blades slidably carried by said rotor and engaging the inner wall of said stator, said inner wall being of elliptical contour to provide intake, compression, power and exhaust strokes for said blades, a carburetor communicating with the intake section of said stator, said rotor being hollow and means for propelling air therethrough to cool the rotor, heat the air and compress it, said carburetor receiving such compressed air from said last means.

3. In a rotary motor, a stator, a rotor therein, blades slidably carried by said rotor and engaging the inner wall of said stator, said inner wall being of elliptical contour to provide intake, compression, power and exhaust strokes for said blades, a carburetor communicating with the intake section of said stator, a fuel plug communicating with the power section of said stator, a pump operated by said rotor and connected with said fuel plug to supply fuel under pressure thereto, and means for simultaneously adjusting the capacity of said fuel pump and the flow of fuel from said carburetor.

4. In combination with an internal combustion engine having a stator, a rotor therein, blades slidably carried by said rotor and engaging the inner wall of said stator, said inner wall being of eliptical contour to provide intake, compression, power and exhaust strokes for said blades, a carburetor communicating with the intake section of said motor, a fuel plug communicating with a combustion chamber of said motor, said fuel plug having a plurality of intake openings to receive different fuels and having discharge openings for the different fuels directly into said combustion chamber, and a pump operated by the motor and connected with said fuel plug to supply fuel under pressure to one of said intake openings.

5. In combination with an internal combustion motor having a stator, a rotor therein, blades slidably carried by said rotor and engaging the inner wall of said stator, said inner wall being of elliptical contour to provide intake, compression, power and exhaust strokes for said blades, a carburetor communicating with the intake section of said motor, means for propelling air through said motor to cool the motor, to heat the air and to compress the air, said carburetor receiving such compressed air from said last means.

MARVIN L. RHINE.